United States Patent [19]
Howard et al.

[11] Patent Number: 5,830,809
[45] Date of Patent: Nov. 3, 1998

[54] LAMINATED REINFORCED FLEXIBLE GRAPHIC ARTICLE

[75] Inventors: Ronald Albert Howard, Brook Park; Robert Angelo Mercuri, Seven Hills, both of Ohio

[73] Assignee: UCAR Carbon Technology Corporation, Danbury, Conn.

[21] Appl. No.: 674,897

[22] Filed: Jul. 3, 1996

Related U.S. Application Data

[63] Continuation of Ser. No. 326,755, Oct. 20, 1994, abandoned, which is a continuation of Ser. No. 962,334, Oct. 16, 1992, abandoned, which is a division of Ser. No. 709,214, Jun. 3, 1991, Pat. No. 5,198,063.

[51] Int. Cl.$^6$ ........................................... B32B 7/00
[52] U.S. Cl. ........................ 442/59; 428/485; 277/227; 277/233
[58] Field of Search ...................... 428/408, 246, 428/251, 421, 422; 156/62.2, 273.9, 282, 309.9, 324, 359, 555, 275, 306.6, 275.5; 277/227, 233, DIG. 6

[56] References Cited

U.S. PATENT DOCUMENTS

| | | | |
|---|---|---|---|
| 3,404,061 | 10/1968 | Shane et al. | 161/125 |
| 4,382,113 | 5/1983 | Schwartz et al. | 428/408 |
| 4,617,231 | 10/1986 | Hamada et al. | 428/297 |
| 4,961,991 | 10/1990 | Howard | 428/246 |
| 5,198,063 | 3/1993 | Howard et al. | 156/282 |

*Primary Examiner*—Merrick Dixon
*Attorney, Agent, or Firm*—Frederick J. McCarthy

[57] ABSTRACT

Method and assembly for reinforcing flexible graphite by fusion bonding a film of thermoplastic polymer to the flexible graphite to form a laminiated product. One side of the thermoplastic polymer is raised to its softening temperature to cause it to bond to the flexible graphite while the opposite side thereof is maintained at a temperature below its softening point.

2 Claims, 1 Drawing Sheet

LAMINATED REINFORCED FLEXIBLE GRAPHIC ARTICLE

This application is a continuation of prior U.S. application Ser. No 08/326,755 filing date Oct. 20, 1994, abandoned Sep. 25, 1996 which is a continuation of application Ser. No 07/962,334 filing date Oct. 16, 1992, now abandoned which is a divisional of application Ser. No. 07/709,214 filing date Jun. 3, 1991, now U.S. Pat. No. 5,198,063.

FIELD OF INVENTION

The present invention relates to a method and assembly for reinforcing flexible graphite and to a reinforced flexible graphite article.

BACKGROUND OF THE INVENTION

The process for manufacturing flexible graphite is well known. In the typical practice and as described in U.S. Pat. No. 3,404,061, the disclosure of which is incorporated herein by reference, flakes of natural graphite are intercalated in an acid solution. After the flakes are intercalated they are washed and dried and then exfoliated by exposure to high temperature or under a flame for a short period of time. This causes the flakes to expand or exfoliate in a direction perpendicular to the crystalline planes of the graphite. The exfoliated graphite flakes are vermiform in appearance and are therefore commonly referred to as worms. The worms may be compressed into sheets or foils with a density approaching theoretical density, although a density of about 70 lbs/ft$^3$ is considered typical for most applications. The sheets of flexible graphite can be cut into any desired configuration to suit a particular application.

It is common to cut thin flexible graphite sheets of between 2–70 mils in thickness into narrow strips of less than about ¼" wide which may then be interwoven into a braided product, spirally wound into a spiral wound gasket or die cut into various sizes for use as a gasket or packing material.

Unfortunately flexible graphite is relatively weak in tensile strength and the narrow strips may tend to break when subjected to bending during handling particularly in the fabrication of a braided or spiral wound product. The weakness in tensile strength may be overcome by attaching very fine long threads of cotton or polymide to the flexible graphite to serve as reinforcement. The threads are adhesively bonded to the sheets of flexible graphite before they are cut into strips. Not only is this method expensive but the use of an adhesive has the potential of gumming up the machinery for cutting the flexible graphite into strips. Another method of reinforcing flexible graphite is to interpose a layer of a material strong in tensile strength between two flexible graphite sheets. The interlayer may be attached to the sheets of flexible graphite using any commercial contact adhesive. Again this method involves using an adhesive which is not only costly but substantially increases the percentage of non-flexible graphite in the final product and unnecessarily adds to the thickness of the final product. Moreover the adhesive may vaporize upon heating leaving a porous body which permits leakage. In addition a thermoplastic adhesive will soften at elevated temperature and increase the probability of shear failure. At present, however, there is no known method for reinforcing flexible graphite without using an adhesive.

SUMMARY OF THE INVENTION

It has been discovered in accordance with the present invention that flexible graphite may be reinforced by laminating a very thin thermoplastic polymer film, preferably under three mils in thickness, to the surface of the graphite sheet without the application of an adhesive. This results in minimal degradation to the flexible graphite properties in the final product and only a nominal increase in the thickness of the final product.

A reinforced flexible graphite sheet is formed in accordance with one embodiment of the present invention by superimposing a thin film of a thermoplastic polymer having a predetermined softening point over a sheet which is performed and initially self-supporting of flexible graphite and fusion bonding said thin film to said flexible graphite by raising the temperature of said thin film at the interface thereof in contact with said flexible graphite to a temperature corresponding to said softening point while maintaining the interface of said thin film of thermoplastic polymer not in contact with said flexible graphite at a temperature below said softening point.

BRIEF DESCRIPTION OF THE DRAWINGS

Other objects and advantages of the present invention will become apparent from the following detailed description of the invention when read in conjunction with the following drawings of which.

DETAILED DESCRIPTION OF THE INVENTION

Figure 1:
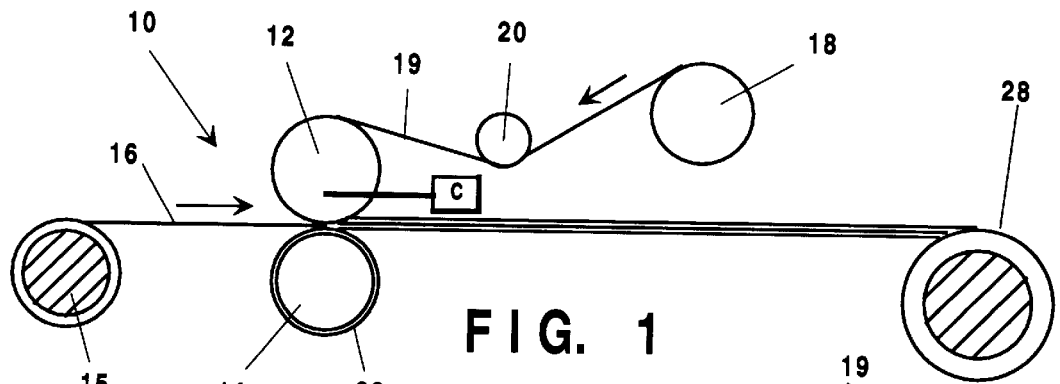
FIG. 1 is a schematic diagram of a calender roll assembly illustrating a preferred embodiment of the invention for forming a reinforced flexible graphite sheet consisting of a two layered laminate.
Figure 1A:
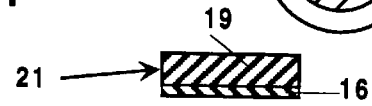
FIG. 1(a) is a cross section of the laminate formed in FIG. 1.

In one embodiment of the present invention as illustrated in FIG. (1) and in FIG. 1(a), a two layer laminate 21 is formed composed of a single layer of flexible graphite 19 and a single layer 16 of a thermoplastic polymer film. The polymer film 16 is preferably under 3.0 mils in thickness and is fusion bonded to the single layer of flexible graphite 19 without the use of an adhesive.

The calender roll assembly 10 of FIG. 1 comprises two calender rolls 12 and 14, a first supply roll 15 for feeding the thin polymer film 16 between the two calender rolls 12 and 14, a second supply roll 18 for directing the sheet of flexible graphite 19 over the calender roll 12 so that it overlaps the film 16 and an idler roll 20 for controlling the tension in the sheet of flexible graphite 19. The calender roll 14 has a coating or cover 22 to thermally control the interface temperature between the film 16 and the roll 14. The calender rolls 12 and 14 are aligned in a vertical relationship relative to one another to calender the sheet of flexible graphite 19 and the thin polymer film 16 into the laminate 21 which is fed to a take up roll 28. The applied pressure between the calender rolls 12 and 14 is not critical and is preferably between a pressure of 20 and 500 psi. Each or both of the calender rolls 12 and 14 may be heated through an internal assembly of heating coils (not shown) with the temperature of each adjusted through a conventional rheostat control C. The roll cover 22 is formed as a coating or an independent member such as a band which is used to thermally insulate the roll 14 from the film 16. The cover 22 may be composed of a silicon coated paper or a composite of polytetrafluoroethylene and fiberglass cloth.

The thin polymer film 16 may be composed of any conventional thermoplastic e.g., ethylene, cellulose derivatives, vinyl resins, polystyrenes, polyamides and acrylic resins with polyethylene being preferred. Although the film thickness is not critical to the invention it is preferred that the polymer film be as thin as possible so as to minimize the volume percent of polymer in the laminated product. The polymer film thickness may lie between 0.2 and 5 mils in thickness but preferably between 0.5 and 3.0 mils in thickness. The thickness ratio between the polymer film 16 and the sheet of flexible graphite 19 determines the volume percent of polymer in the laminated product and should be selected such that the volume percent of polymer lies between 0.5 and 10.0% and optimally under about 3.0%. A 0.5 mil polymer film laminated to a 30 mil thick graphite sheet is equivalent to 1.6 volume percent of polymer in the laminated product whereas in an equivalent three layer dual polymer film laminate the volume percent of polymer increases to 3.2 percent.

To fusion bond very thin polymer film to a sheet of graphite the film temperature must be raised to its softening point but only at the interface engaging the flexible graphite. In accordance with the present invention if only one surface is in engagement with a sheet of flexible graphite the opposite or nonengaging side of the polymer film must be held at a temperature below the softening point of the polymer film. Accordingly, control of the interface temperature between the polymer film and the sheet of flexible graphite is critical. In the embodiment of FIG. 1, the temperature of the polymer film 16 at the interface in contact with the graphite sheet 19 is controlled by adjusting the temperature of the calender roll 12 by means of the control C to a level high enough, based on the feed rate of the graphite sheet 19 and the composition of the polymer film 16, to raise the interface temperature to the softening point of the polymer film 16. If the temperature of the roll 12 is raised too high the polymer film 16 will deform and break during the calendering operation. If the roll temperature is too low the film 16 will not fusion bond to the graphite sheet. For the bond to be continuous the interface temperature should be slightly higher than the softening point of the polymer film 16. Higher softening point polymers require correspondingly higher temperature rolls. As an example, a 0.0005 inch polyethylene sheet will bond to a 0.015 inch flexible graphite sheet fed at a rate of 25 ft/min by raising the calender roll 12 to a temperature of about 125° C. As an alternative to heating the roll 12 the graphite sheet 16 may be heated or both may be controllably heated.

As stated above, it is critical to the embodiment of FIG. 1 that the non-contacting surface of the polymer film 16 be kept at a temperature below its softening point. This is accomplished in the embodiment of FIG. 1 using the cover 22 which surrounds the surface of the roll 14. The cover 22, as explained earlier, can be fitted over the roll 14 in the form of a band or formed as a coating or laminated to the roll. The cover 22 functions to thermally isolate the polymer film 16 from the calender roll 14. Another alternative would be to water or air cool the roll 14.

A three layer laminate may also be formed in accordance with of the present invention composed of either two thin sheets of flexible graphite and an interlayer of a thin polymer film or two sheets of polymer film and an interlayer of flexible graphite.

Figure 2:
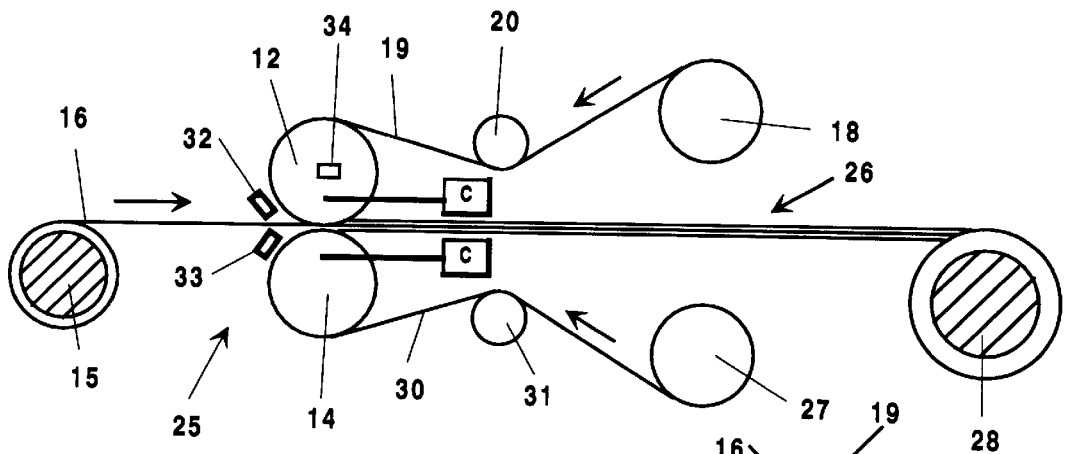
FIG. 2 is a schematic diagram of a calender roll assembly in accordance with the present invention for forming a three layered laminate with an interlayer of a thermoplastic polymer film.
Figure 2A:
FIG. 2(a) is a cross section of the laminate formed in FIG. 2.

A calender roll assembly 25 for fabricating a three layer laminate 26 with the polymer film 16 as the interlayer is shown in FIG. 2 and is substantially similar to the calender roll assembly 10 of FIG. 1 with like reference numerals used to denote corresponding components. In the calender assembly 25 an additional supply roll 27 is used for feeding a second graphite sheet 30 over the calender roll 14 with the polymer film 16 fed into the calender roll assembly 25 to form an interlayer. In this embodiment the calender roll 14 is not insulated and is instead heated to a temperature substantially equal to the temperature of the heated calender roll 12. An additional idler roll 31 is used to control the tension in the second graphite sheet 30. The heated calender rolls 12 and 14 conduct heat through the graphite sheets 19 and 30 into the polymer film 16 with the interface temperature controlled to soften and bond the polymer film to the layers of flexible graphite 19 and 30. Once again the roll temperature is critical to achieve a continuous bond. The roll temperature may be measured using, e.g., IR temperature sensors 32 and 33 respectively. If the temperature is too high the bond will separate as the layers pass from the calender rolls 12 and 14. If the temperature is too low no bonding occurs or the bond is not continuous. A roll temperature of between 20°–35° C. above the softening point of the polymer film is generally adequate. This temperature is however dependent upon the feed rate of the sheets of flexible graphite and polymer film, the applied pressure between the calender rolls and the thickness of the various layers. The feed or line rate may also be adjusted to maintain an adequate temperature differential. The applied pressure may be measured using a conventional pressure sensor 34. The optimum roll temperature for a given line speed is based upon establishing a temperature at the interface between each sheet of flexible graphite and the polymer film of just slightly above the softening temperature for the polymer film.

Figure 3:
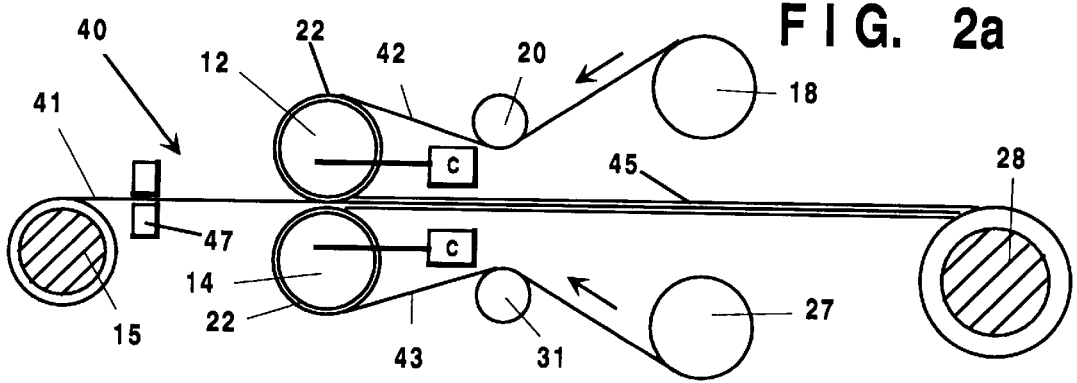
FIG. 3 is another schematic diagram of a calender roll assembly for forming a three layer laminate with a flexible graphite interlayer.
Figure 3A:
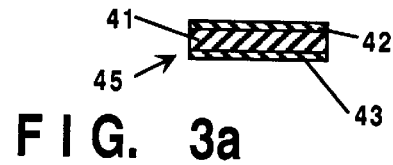
FIG. 3(a) is a cross section of the laminate formed in FIG. 3.

A three layer laminate may also be fabricated with a flexible graphite interlayer and a layer of polymer film bonded to the flexible graphite sheet on opposite sides thereof. The calender roll assembly 40 as shown in FIG. 3 may be used for this purpose and is basically similar to the assembly 25 of FIG. 2 with corresponding components having the same reference numerals. A flexible graphite sheet 41 is fed from the feed roll 15 between the calender rolls 12 and 14. A separate polymer film 42 and 43, equivalent in thickness and composition to film 16, is fed over each of the calender rolls 12 and 14 in a superimposed relationship to the graphite sheet 41 to form a three layer laminate 45 with the graphite sheet 41 in the center. In this embodiment each calender roll 12 and 14 is thermally insulated from each polymer film 42 and 43 by an insulating cover 22 which surrounds the calender rolls 12 and 14 to maintain the side of the polymer film not in contact with flexible graphite at a temperature below the softening point of the polymer film. Heat is conducted to the polymer film by preheating the flexible graphite sheet 41. This is preferably accomplished using an infrared heater 47 or by connecting the sheet 41 to an electrical circuit (not shown) for passing current through the sheet 41.

What is claimed is:

1. A two layer laminated composite consisting of a first and second layer being in the form of a sheet of flexible graphite as the first layer and a thin film of thermoplastic polymer of under 3.0 mils in thickness superimposed on said sheet of flexible graphite as the second layer, said superimposed film having initially unsoftened opposed surfaces with one said surface of said superimposed film being contiguous said flexible graphite sheet and being fusion bonded directly thereto by thermal softening only of said contiguous film surface and the opposed film surface being unsoftened and forming an outer surface of said two layer laminated composite.

2. A laminated composite in accordance with claim 1 wherein the film and graphite are in a ratio such that the volume percent of polymer in said composite is between 0.5 and 10%.

* * * * *

UNITED STATES PATENT AND TRADEMARK OFFICE
CERTIFICATE OF CORRECTION

PATENT NO. : 5,830,809
DATED : November 3, 1998
INVENTOR(S) : R.A. Howard et al It is certified that error appears in the above-identified patent and that said Letters Patent is hereby corrected as shown below:

On the title page, Item [54] and Column 1, line 2,

Change "Graphic" to --Graphite--

Signed and Sealed this

First Day of June, 1999

*Attest:*

Q. TODD DICKINSON

*Attesting Officer*      *Acting Commissioner of Patents and Trademarks*